United States Patent Office

3,769,340
Patented Oct. 30, 1973

3,769,340
SULFINYL CHLORIDES
Paul C. Aichenegg, Prairie Village, Kans., and Larry M. Bain, Independence, Mo., assignors to Chemagro Corporation, New York, N.Y.
No Drawing. Filed Oct. 4, 1966, Ser. No. 584,104
Int. Cl. C07c 145/00
U.S. Cl. 260—543 R        7 Claims

ABSTRACT OF THE DISCLOSURE

Compounds of the Formula 1

$$R_4-\underset{\underset{R_2}{|}}{\overset{\overset{R_1}{|}}{C}}-\underset{\underset{H}{|}}{\overset{\overset{R_3}{|}}{C}}-\overset{\overset{O}{\|}}{S}-Cl$$

or the Formula 2

$$\underset{\underset{R_6}{|}}{\overset{\overset{R_5}{|}}{C}}=\underset{\underset{R_7}{|}}{C}-\overset{\overset{O}{\|}}{S}-Cl$$

in which at least 3 of the $R_1$, $R_2$, $R_3$ and $R_4$ are halogen of atomic weight 35 to 80 and the remaining number of $R_1$, $R_2$, $R_3$ and $R_4$ is such a halogen or is hydrogen and at least two of $R_5$, $R_6$ and $R_7$ are halogen of atomic weight 35 to 80 and the remaining number of $R_5$, $R_6$ and $R_7$ is such a halogen or is hyrdogen. A process for preparing the compounds is also disclosed.

---

The present invention relates to the preparation of novel sulfinyl chlorides.

It is an object of the present invention to prepare novel sulfinyl chlorides.

Another object is to prepare chemical intermediates having a high order of reactivity toward nucleophiles and make accessible many new esters, thioesters and amidates.

A further object is to prepare sulfinyl chlorides which can be used to form sulfinates which are more stable than the corresponding sulfenates.

Yet another object is to prepare sulfinyl chlorides which are useful in the agricultural, chemical and animal health fields.

A still further object is to prepare sulfinyl chlorides useful in preparing biologically active esters and thioesters.

Still further objects and the entire scope of applicability of the present invention will become apparent from the detailed description given hereintfter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing sulfinyl chlorides having one of the following formulae $$R_4-\underset{\underset{R_2}{|}}{\overset{\overset{R_1}{|}}{C}}-\underset{\underset{H}{|}}{\overset{\overset{R_3}{|}}{C}}-\overset{\overset{O}{\|}}{S}-Cl \quad \text{and} \quad \underset{\underset{R_6}{|}}{\overset{\overset{R_5}{|}}{C}}=\underset{\underset{R_7}{|}}{C}-\overset{\overset{O}{\|}}{S}-Cl$$

I                II where at least three of $R_1$, $R_2$, $R_3$ and $R_4$ are halogen of atomic weight 35 to 80 (i.e. they are chlorine or bromine) and the remaining member of $R_1$, $R_2$, $R_3$ and $R_4$ is halogen of atomic weight 35 to 80 or is hydrogen; at least two of $R_5$, $R_6$ and $R_7$ are halogen of atomic weight 35 to 80 and the remaining member of $R_5$, $R_6$ and $R_7$ is halogen of atomic weight 35 to 80 or is hydrogen. Preferably three of $R_1$, $R_2$, $R_3$ and $R_4$ are chlorine and the remaining member is hydrogen. Preferably two of $R_5$, $R_6$ and $R_7$ are chlorine and the remaining member is hydrogen.

The compounds of the present invention are useful as nematocides, fungicides and bactericides. Thus they can be used to kill Panagrellus and Rhabditis spp. in soil and can be used to kill Pythium spp. in soil infected with this organism.

They are particularly useful, however, as intermediates in preparing new esters and thioesters, amidates and other compounds which are more stable than analogous compounds derived from sulfenyl chlorides; e.g. the sulfinates prepared from the compounds of the present invention are more stable than the corresponding sulfenates made from sulfenyl chlorides. This is particularly true in the aliphatic series.

Examples of compounds within the present invention are 1,2,2-trichloroethyl sulfinyl chloride, 2,2,2-trichloroethyl sulfinyl chloride, 1,2,2,2-tetrachloroethyl sulfinyl chloride, 2,2-dichlorovinyl sulfinyl chloride, 1,2,2-trichlorovinyl sulfinyl chloride 1,2-dichlorovinyl sulfinyl chloride, 2,2-dibromovinyl sulfinyl chloride, 2-chloro-2-bromovinyl sulfinyl chloride, 1,2,-tribromoethyl sulfinyl chloride.

The compounds of the present invention can be prepared by several different methods. Thus the corresponding sulfenyl chloride can be oxidized with a dry ozone-oxygen mixture. For convenience a solvent such as dry chloroform or carbon tetrachloride is employed. It is important that substantially anhydrous conditions be employed to avoid losses due to hydrolysis or other side reactions.

The reaction procedure is illustrated as follows:

$$CHCl_2CHClSCl + O_3 \longrightarrow CHCl_2CHCl\overset{\overset{O}{\|}}{S}Cl + O_2$$

An alternative method is chlorination of the sulfenyl chloride in acetic acid (or propionic acid). The reaction procedure is illustrated as follows:

$$CCl_3CHClSCl + CH_3COOH + Cl_2 \longrightarrow$$
$$CCl_3CHCl\overset{\overset{O}{\|}}{S}Cl + CH_3COCl + HC$$

The oxidation using chlorine in acetic acid leads to some sulfone contamination and does not give as pure products as the ozone oxidation method.

Another method which has been employed has been the oxidation of the appropriate sulfenyl chloride with 3 - chloro perbenzoic acid in equimolar amounts and under anhydrous conditions. This method has been found best in preparing 1,2,2,2-tetrachloroethyl sulfinyl chloride and in preparing the unsaturated sulfinyl chlorides. Ozonation of the unsaturated sulfenyl chlorides causes some olefinic bond cleavage while chlorination in acetic acid results in some byproduct formation. The ester derivatives of vinyl sulfinyl chloride prepared by reacting the polyhalovinyl sulfinyl chloride with the appropriate alcohol or mercaptan give purer esters than similar compounds obtained by dehydrohalogenation of the appropriate saturated alkyl polyhaloalkyl sulfinate to the corresponding vinyl sulfinate.

Unless otherwise indicated all parts and percentages are by weight.

EXAMPLE 1

53 grams (0.26 mole) of dry 1,2,2 - trichloroethyl sulfenylchloride were dissolved in 400 cc. of dry chloroform and a dry stream of ozone in oxygen passed through the solution at a temperature of 10–15° C. in a finely dispersed form. The ozone concentration used was 88 milligrams per liter of oxygen at a velocity of gas flow of 0.54 liter per minute (0.019 cubic ft/min.). Under these conditions 0.26 mole of sulfenyl chloride for oxidation to the sulfinyl chloride theoretically needed a 4.4 hour ozonation period. Actually an 8 hour period was applied to effect the change in color of the solution from orange to light green. The solvent was stripped off followed by fractionation in high vacuum to give 40 grams (71% yield) of distilled 1,2,2-trichloroethyl sulfinyl chloride as a light yellow liquid, B.P.$_{0.08}$ 49–50° C., $n_D^{30}$ 1.5465, percent Cl, 65.7 theory, 65.1 found; percent S, 14.9 theory, 14.6 found.

EXAMPLE 2

Another batch of 1,2,2-trichloroethyl sulfinyl chloride was made from 180 grams (0.9 mole) of 1,2,2-trichloroethyl sulfenyl chloride diluted to 2,000 cc., with dry chloroform and ozonation at 5–10° C. for 12 hours using the same finely dispersed $O_3/O_2$ stream as in Example 1 to give the desired product in an amount of 150 grams (77% yield) as a yellow liquid, B.P.$_{0.08}$ 49–51° C., $n_D^{25}$ 1.5465.

EXAMPLE 3

20 grams (0.1 mole) of 1,2,2-trichloroethyl sulfenyl chloride were added dropwise to a suspension of 17.2 grams (0.1 mole) of m-chloroperbenzoic acid in 100 ml. of dry carbon tetrachloride with rapid stirring while allowing the temperature to rise slowly to between 30° C. and 40° C. Stirring was continued for a further ½ hour and the mixture allowed to stand for 48 hours at room temperature. Chilling to 0° C., removing the solid m-chlorobenzoic acid by filtration and evaporating the carbon tetrachloride in high vacuum gave 21.6 grams (quantitative yield) of crude, 1,2,2-trichloroethyl sulfinyl chloride, $n_D^{24}$ 1.5462 which was contaminated with a small amount of m-chlorobenzoic acid. Distillation in high vacuum gave 15.5 grams (72% yield) of pure 1,2,2-trichloroethyl sulfinyl chloride, B.P.$_{0.04}$ 54–62° C, $n_D^{24}$ 1.5517, percent Cl, 65.1, percent S, 14.5, and having the identical infrared absorptions as the product of Example 1.

EXAMPLE 4

250 grams (1.25 mole) of 2,2,2-trichloroethyl sulfenyl chloride were diluted with 600 cc. of chloroform, cooled to 10–15° C. and a dry ozone in oxygen stream passed through the solution in a finely divided form, keeping the mixture at below 15° C. There was employed an 84 milligram/liter ozone concentration at a flow rate of 0.566 liter/minute (0.02 cubic foot/minute). After a total ozone introduction period of 20 hours the whole was freed of solvent by vacuum stripping and fractionated in high vacuum. 231.5 grams (85% yield) of pure 2,2,2-trichloroethyl sulfinyl chloride were obtained as a light yellow liquid, B.P.$_{0.1}$ 53–56° C., $n_D^{26}$ 1.5355, S, 14.7% (theory 14.9%), Cl, 64.2% (theory 65.7%).

EXAMPLE 5

The same product was prepared from 2,2,2-trichloroethyl sulfenyl chloride, acetic acid and chlorine according to the equation

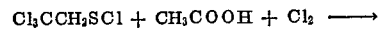
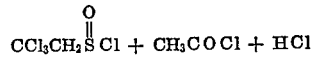

Even when using a large excess of chlorine, only a small amount of 2,2,2-trichloroethyl sulfonyl chloride was formed as an impurity.

20 grams (0.1 mole) of 2,2,2-trichloroethyl sulfenyl chloride were diluted with 50 grams (a threefold excess) of glacial acetic acid, cooled to 0–5° C. (in an icewater bath) and 14 grams of dry chlorine gas were introduced at a fast rate over a period of 10 minutes while maintaining a temperature not exceeding 7° C. A Dry Ice condenser was used to keep the unreacted chlorine gas in the system. During a further 2 hour period, the mixture was then allowed to warm to room temperature. After standing overnight and then heating for 1 hour at 65–75° C. considerable quantities of unreacted chlorine were still present.

Stripping off all volatiles and fractionation in high vacuum gave 16 grams (74% yield) of 2,2,2-trichloroethyl sulfinyl chloride containing small amounts of acetic acid and sulfone as impurities, B.P.$_{0.3}$ 44° C., $n_D^{23}$ 1.5300.

EXAMPLE 6

Attempts to prepare 1,2,2,2-tetrachloroethyl sulfinyl chloride by ozonation or by chlorination in acetic acid were unsuccessful. However, it was successfully prepared in the following manner.

34 grams (0.2 mole) of m-chloroperbenzoic acid were suspended in 200 ml. of dry carbon tetrachloride and 46 grams (0.2 mole) of 1,2,2,2-tetrachloroethyl sulfenyl chloride were added dropwise to the stirred suspension previously preheated at 30–35° C. The rate of addition was controlled to give a temperature not to exceed 40° C. The addition time can be 1–2 hours and was 1.5 hours in the actual example. After allowing the mixture to stand overnight, it was heated to 80° C. for a short time in order to effect complete solution. The mixture was next chilled at 0° C. and after the complete crystallization of m-chlorobenzoic acid, filtration and removal of solvent from the filtrate by means of high vacuum stripping. There were obtained 53 grams of crude 1,2,2,2-tetrachloroethyl sulfinyl chloride which yielded 38 grams (76% yield) of the pure product as a yellow liquid, B.P. 58–63° C., $n_D^{26}$ 1.5610.

EXAMPLE 7

The unsaturated sulfinyl chlorides could not be made by ozonation of the unsaturated sulfenyl chlorides due to the formation of breakdown products as the result of olefinic bond cleavage. Chlorination in acetic acid led to the formation of byproducts as a result of competing addition reactions. However, oxidation with m-chloroperbenzoic acid under anhydrous conditions gave good yields of the desired unsaturated sulfinyl chlorides. This procedure also gave purer products than could be prepared by dehydrochlorination of the polyhaloethyl sulfinyl chlorides.

65.2 grams (0.4 mole) of 2,2-dichlorovinyl sulfenyl chloride (Aichenegg Pat. 3,155,720) were added with stirring and cooling to a suspension of 70 grams (0.4 mole plus a slight excess) of m-chloroperbenzoic acid in 250 ml. of dry carbon tetrachloride at 30–35° C. After addition of the sulfenyl chloride was completed 3 more grams of m-chloroperbenzoic acid were added to the well stirred mixture in order to effect a color change from deep to very slight yellow. Heating for a short period to 50° C. and standing overnight followed by heating at 75–80° C. to obtain a solution completed the oxidation. Most of the m-chlorobenzoic acid formed was removed by chilling the mixture to 0° C. followed by filtration. Stripping in a high vacuum gave 88 grams of a red oil which contained some m-chlorobenzoic acid. Distillation in a high vacuum gave 47.5 grams (66% yield) of 2,2-dichlorovinyl sulfinyl chloride as a yellow oil) B.P.$_{4.0}$ 55–60° C., $n_D^{25}$ 1.5674.

EXAMPLE 8

17.5 grams (0.088 mole) of perchlorovinyl sulfenyl chloride in 75 ml. of dry carbon tetrachloride were added dropwise with stirring to a solution of 15.2 grams of m-chloroperbenzoic acid in 100 ml. of dry carbon tetrachloride at 55–60° C. The red solution of the perchlorovinyl sulfenyl chloride turned yellow on contact with the m-chloroperbenzoic acid. The mixture was allowed to react to completion for 1 further hour at 50–60° C. and stirred at room temperature for 2 further hours, magnesium sulfate was added and the mixture chilled to 0° C. and filtered to remove most of the m-chlorobenzoic acid formed.

Stripping in high vacuum gave 12 grams (64% yield) of crude perchlorovinyl sulfinyl chloride contaminated with a small amount of m-chlorobenzoic acid. The crude product was again distilled to give 7.0 grams of purified perchlorovinyl sulfinyl chloride (also call 1,2,2-trichlorovinyl sulfinyl chloride) as a light yellow oil, B.P.$_{0.08}$ 53–58° C., $n_D^{25}$ 1.5860.

As previously indicated the sulfinyl chlorides of the present invention can be used to prepare sulfinates and thiosulfinates according to the equations

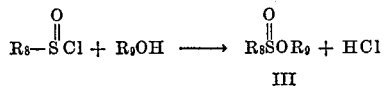

III

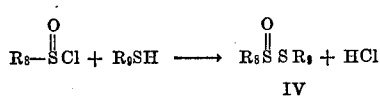

IV

Where $R_8$ is polyhaloethyl or polyhalovinyl and $R_9$ is alkyl or haloalkyl.

Thus the compounds of the present invention can be reacted with alcohols such as methyl alcohol, ethyl alcohol, propyl alcohol, isopropyl alcohol, butyl alcohol, octyl alcohol, sec. octyl alcohol, isooctyl alcohol, amyl alcohol, 2,2,2-trichloroethyl alcohol, ethylene chlorohydrin, propylene chlorohydrin, trimethylene chlorohydrin, 1,3-dichloro-2-propanol, ethylene bromohydrin or mercaptans such as methyl mercaptan, ethyl mercaptan, propyl mercaptan, butyl mercaptan, sec. butyl mercaptan, amyl mercaptan and octyl mercaptan to form sulfinates and thiosulfinates within Formulae III and IV supra. These sulfinates and thiosulfinates of Formulae III and IV are extremely useful as nematocides, fungicides and bactericides. Thus they have shown nematocidal activity against saprophytic nematocles such as Panagrellus and Rhabditis spp. and parasitic nematodes such as Meloidogyne spp. They have also been found to be fungicides in tests against *Ceratocystis ulmi, Colletotrichum obiculare, Fusarium, Helminthosporium sativum, Rhizoctonia solani, Verticillium albo-atrum, Pythium irregulare* and *Alternaria*. They also showed some desiccant activity for cotton as well as mild pre and post emergent herbicide activity in tests on oats, wheat, flax, radishes and sugar beets.

The unsaturated esters and thioesters of Formulae III and IV can also be formed by dehydrochlorination of the corresponding saturated esters. However, purer products are obtained by reaction of the appropriate alcohol or mercaptan with the polyhalovinyl sulfinyl chloride.

EXAMPLE 9

14.9 grams (0.1 mole) of redistilled 2,2,2-trichloroethyl alcohol were mixed directly with 10.8 grams (0.05 mole) of 1,2,2-trichloroethyl sulfinyl chloride at room temperature. As no exothermic reaction was observed the mixture was heated to 80–90° C. and kept at this temperature in a dry nitrogen atmosphere for approximately 1 hour, until most of the hydrogen chloride formed was expelled. Cooling the mixture, extracting with 5 volumes of water, drying of the heavy organic layer over magnesium sulfate, stripping and distillation gave 10.0 grams (about 60% yield) of B-trichloroethyl-1,2,2-trichloroethane sulfinate as an oil, B.P.$_{0.6}$ 130–135° C., $n_D^{23}$ 1.5181. This product exhibited saprophytic nematocide activity against Panagrellus and Rhabditis spp. and fungicidal activity against *Colletotrichum obiculare, Helminthosporium sativum, Rhizoctonia solani, Verticillium albo-atrum, Pythium irregulare* and *Alternaria*. It also acted as a desiccant for cotton and showed post emergent herbicide activity when tested on oats, wheat, flax, radishes and sugar beets.

EXAMPLE 10

21.6 grams (0.1 mole) of 2,2,2-trichloroethyl sulfinyl chloride were added to 30 ml. (an excess) of dry methyl alcohol at 25–30° C. with slight cooling and allowed to stand overnight at room temperature. Evaporation in high vacuum gave 20.0 grams (95% yield) of methyl 2,2,2-trichloroethane sulfinate as a liquid, $n_D^{25}$ 1.5060, Cl, 50.1% (theory 50.0%), S, 15.1% (theory 15.1%) and having an ester type odor.

EXAMPLE 11

20.0 grams (0.093 mole) of 2,2,2-trichloroethyl sulfinyl chloride were added to approximately 50 ml. of absolute ethyl alcohol at room temperature. The mixture was refluxed for 1 hour to complete the reaction. The whole mixture was evaporated in high vacuum and 20.5 grams (95% yield) of ethyl 2,2,2-trichloroethane sulfinate were obtained as an almost colorless liquid $n_D^{24}$ 1.4960 having an ester type odor.

EXAMPLE 12

6.3 grams (0.03 mole) of methyl 2,2,2-trichloroethane sulfinate were dissolved in 50 ml. of 1:1:1 (by volume) tetrahydrofuran:benzene:petroleum ether and reacted with 3 grams (0.03 mole) of triethyl amine by dropwise adding the latter with stirring at room temperature and finally at 50° C. and holding at this temperature for 1 further hour. 4.0 grams (quantitative recovery) of triethyl amine hydrochloride were recovered by filtration and a deep yellow oil was obtained as the residue after high vacuum stripping. 5.0 grams (95% yield) of impure methyl 2,2-dichloroethene sulfinate, $n_D^{29}$ 1.5110 were thus obtained.

EXAMPLE 13

17.9 grams (0.1 mole) of 2,2-dichlorovinyl sulfinyl chloride were added to 30 ml. of dry methyl alcohol at 20–25° C. (external cooling with cold water) and the resulting mixture refluxed for 1 hour. By the end of this heating period the HCl evolution practically ceased. The mixture was allowed to stand overnight at room temperature and high vacuum evaporation gave 15 grams (86% yield) of methyl 2,2-dichloroethene sulfinate as a pale yellow liquid, $n_D^{25}$ 1.5296, Cl, 40.4% (theory 40.6%). This product was of considerably better purity than the product of Example 12.

EXAMPLE 14

14.3 grams (0.06 mole) of isopropyl 2,2,2-trichloroethane sulfinate (prepared by reacting isopropyl alcohol with 2,2,2-trichloroethyl sulfinyl chloride in a manner similar to that described in Example 10 for making methyl 2,2,2-trichloroethane sulfinate) were diluted with 100 mls. of dry benzene and 6.0 grams (0.06 mole) of triethyl amine in 10 ml. of benzene were added dropwise with stirring and occasional cooling, 50 ml. of tetrahydrofuran were added and the whole was allowed to stand for 48 hours at room temperature. 7.7 grams (94% recovery) of triethyl amine hydrochloride were recovered by filtration and 11.5 grams (94.5% yield) of isopropyl 2,2-dichloroethene sulfinate were obtained as a residue after high vacuum evaporation (distillation) of the filtrate, $n_D^{30}$ 1.4920, Cl, 34.7% (theory 35.0%), S, 15.4% (theory 15.7%). The product was found to be effective as a saprophytic nematocide against Panagrellus and Rhabditis and as a parasitic nematocide against Meloidogyne spp. It was also an effective fungicide against *Ceratocystis ulmi, Colletotrichum obiculare, Fusarium, Helminthosporium sativum, Rhizoctonia solani, Verticillium albo-atrum, Pythium irregulare* and *Alternaria*. It was effective in plate fungi tests, seed fungicide tests and spore germination tests. It also showed minor desiccant activity for cotton and minor pre and post emergent herbicide activity, e.g. with oats, wheat, flax, radishes and sugar beets.

The saprophytic and parasitic nematocide tests and plate fungicide tests in the present application were carried out at 400 p.p.m., 200 p.p.m., 100 p.p.m., 25 p.p.m., and 10 p.p.m. using the procedure set forth in Aichenegg Patent 3,249,495.

EXAMPLE 15

12.5 grams (0.05 mole) of 1,2,2,2-tetrachloroethyl sulfinylchloride were diluted with 50 ml. of dry chloroform and 4.5 grams (0.05 mole) of freshly distilled butyl mercaptan added dropwise with stirring. The reaction temperature was allowed to reach 35° C., magnesium sulfate added and the mixture allowed to stand overnight at room temperature. The mixture was heated to gentle reflux until HCl evolution ceased. The mixture was then filtered and stripped in high vacuum to give 15 grams (99% yield) of n-butyl 1,2,2,2-tetrachloroethane thiosulfinate as an almost colorless liquid, $n_D^{25}$ 1.5344.

We claim:

1. A compound having the formula

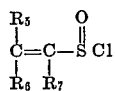

where at least two of $R_5$, $R_6$ and $R_7$ are chlorine and the remaining member of $R_5$, $R_6$ and $R_7$ is chlorine or hydrogen.

2. A compound according to claim 1 which is 2,2-dichlorovinyl sulfinyl chloride.

3. A compound according to claim 1 which is perchlorovinyl sulfinyl chloride.

4. A compound according to claim 1 which is 1,2-dichlorovinyl sulfinyl chloride.

5. A process of preparing a compound having the formula

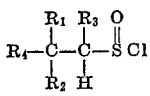

where at least three of $R_1$, $R_2$, $R_3$ and $R_4$ are halogen of atomic weight 35 to 80 and the remaining member of $R_1$, $R_2$, $R_3$ and $R_4$ is such a halogen or is hydrogen, and in which all the halogen atoms are chlorine atoms comprising oxidizing under substantially anhydrous conditions a sulfenyl chloride of the formula

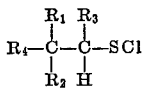

with a mixture of ozone and oxygen as an oxidizing agent.

6. A process of preparing a compound having a formula selected from the group consisting of (1) 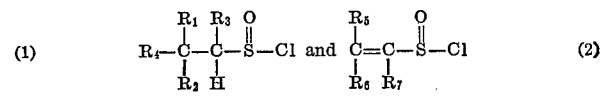 (2)

where at least three of $R_1$, $R_2$, $R_3$ and $R_4$ are halogen of atomic weight 35 to 80 and the remaining member of $R_1$, $R_2$, $R_3$ and $R_4$ is such a halogen or is hydrogen and at least two of $R_5$, $R_6$ and $R_7$ are halogen of atomic weight 35 to 80 and the remaining member of $R_5$, $R_6$ and $R_7$ is such a halogen or is hydrogen comprising oxidizing under substantially anhydrous conditions a sulfenyl chloride of the formula (3) 

or (4) 

with chloroperbenzoic acid as an oxidizing agent.

7. A process of preparing a compound according to claim 6 having Formula 2 and in which all the halogen atoms are chlorine atoms comprising oxidizing under substantially anhydrous conditions a sulfenyl chloride of the formula

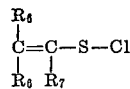

with chloroperbenzoic acid as an oxidizing agent.

References Cited

UNITED STATES PATENTS

| | | | |
|---|---|---|---|
| 3,200,146 | 8/1965 | Weil et al. | 260—543 H |
| 3,259,653 | 7/1966 | Weil et al. | 260—543 H |
| 3,296,302 | 1/1967 | Weil et al. | 260—543 H |

FOREIGN PATENTS 159,835  3/1964  Russia _____ 260—543

OTHER REFERENCES

Beilstein: Organischen Chemie., vol. 3, p. 18 (1922).
Meusen et al.; Berichte duet. Chem., vol. 69, pp. 937–946 (pp. 944–945 particularly relied upon) (1936).
Houben-Weyl: Methoden der Organischen Chemie, vol. 9, p. 319 (1955).

LORRAINE A. WEINBERGER, Primary Examiner

R. D. KELLY, Assistant Examiner

U.S. Cl. X.R.

260—456 R; 424—315